(12) United States Patent
Kaneda et al.

(10) Patent No.: US 6,798,473 B2
(45) Date of Patent: Sep. 28, 2004

(54) COLOR LIQUID CRYSTAL DISPLAY DEVICE AND MANUFACTURING METHOD THEREOF

(75) Inventors: Yoshihiro Kaneda, Saiatama (JP); Makoto Arai, Tokorozawa (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 10/390,651

(22) Filed: Mar. 19, 2003

(65) Prior Publication Data

US 2004/0004683 A1 Jan. 8, 2004

(30) Foreign Application Priority Data

Mar. 25, 2002 (JP) ........................................ 2002-083008
Mar. 12, 2003 (JP) ........................................ 2003-066040

(51) Int. Cl.[7] ............................................. G02F 1/1335
(52) U.S. Cl. .................................... 349/106; 349/114
(58) Field of Search ................................ 349/106, 113, 349/114, 122, 138; 359/245, 254, 263

(56) References Cited

U.S. PATENT DOCUMENTS 6,211,992 B1 * 4/2001 Van Aerle et al. .......... 359/254
6,501,521 B2 * 12/2002 Matsushita et al. ......... 349/106
6,522,377 B2 * 2/2003 Kim et al. ................... 349/114
6,621,543 B2 * 9/2003 Moon ......................... 349/115
6,690,438 B2 * 2/2004 Sekiguchi ................... 349/114

FOREIGN PATENT DOCUMENTS

JP     2001-281648     10/2001

* cited by examiner

Primary Examiner—Tarifur R. Chowdhury
Assistant Examiner—David Chung
(74) Attorney, Agent, or Firm—Sughrue Mion, PLLC

(57) ABSTRACT

A metal film is laminated on a glass substrate and a photosensitive resin film is coated on the metal film. The metal film and the photosensitive resin film are selectively removed by means of exposure and development in the area that turns into a transmission area in each pixel that is a unit displaying colors such as red, green, and blue. Thus, a reflection layer and an adjustment layer are left intact in a reflection area of each pixel. Color filters are formed on both the transmission area and the adjustment film. The total thickness of the reflection layer and the adjustment film is controlled to be about the half of the thickness of the color filters in the transmission area.

24 Claims, 8 Drawing Sheets

COLOR LIQUID CRYSTAL DISPLAY DEVICE AND MANUFACTURING METHOD THEREOF

BACKGROUND OF THE INVENTION

1) Field of the Invention

The present invention relates to a half-transmission and half-reflection type color liquid crystal display device which comprises a reflection area having a reflection layer and a color filter, and a transmission area having a color filter without the reflection layer, in each pixel of Red (R), Green (G), and Blue (B) color, and a manufacturing method of the same.

2) Description of the Related Art

FIG. 9 is a cross section of a conventional color liquid crystal display device of the half-transmission and half-reflection type. As shown in FIG. 9, in a reflection area 100 of each pixel, a reflection layer 2 is provided on a glass substrate 1b as a first substrate. An overcoat layer 3a is formed on the glass substrate 1b, and red, green, or blue color filters 4a, 4b, and, 4c are formed on the overcoat layer 3a. On the other hand, the reflection layer 2 is not provided in the transmission area 101 of each pixel.

FIGS. 10A to 10F show process flow charts of a manufacturing process of the color liquid crystal display device shown in FIG. 9. At first, as shown in FIG. 10A, a 0.1 μm-thick metal film of Al or Ag and the like that turns into the reflection layer 2 is formed on the glass substrate 1b by means of sputtering or vacuum evaporation. Then, a positive photo resist 9 is coated on the surface of the metal film.

As shown in FIG. 10B, the photo resist 9 is exposed by using a photo mask 10 that has desired patterns. Then, the development and etching are performed. As shown in FIG. 10C, the metal film in the transmission area 101 is removed so that the metal film remains only in the reflection area 100, thus the reflection layer 2 is formed. As shown in FIG. 10D, the remaining photo resist 9 is removed.

As shown in FIG. 10E, the overcoat layer 3a with a thickness of 0.02 μm of $SiO_2$ or the like is formed on all over the surface of the substrate by sputtering. As shown in FIG. 10F, pigment dispersion type color filters 4a, 4b, and 4c having a thickness of around 0.7 μm are formed on the surface of the overcoat layer 3a. Furthermore, a transparent electrode pattern 5b and an alignment layer 6b are deposited sequentially on the color filters 4a, 4b, and 4c. The color liquid crystal display device having the structure shown in FIG. 9 is obtained by injecting a liquid crystal 7 in between the substrate and a facing substrate 1a having the transparent electrode pattern 5a and the alignment layer 6a, after the two substrates are panel aligned.

Incidentally, in the half-transparent and half-reflection type color liquid crystal display device, it is known, in Japanese Patent Laid-Open No. 2001-281648, that the colors displayed by transmission lights are lighter in color than the colors displayed by reflection lights. This phenomenon is caused because the number of times the light passes through the color filters is different in the reflecting area 100 and in the transmission area 101.

Namely, as shown in FIG. 9, in the reflection area 100, an outside light R, which enters from the front side of the panel, reaches the reflection layer 2, after passing through the facing substrate 1a, the liquid crystal 7, and the color filters 4a, 4b, and, 4c, then returns through the color filters 4a, 4b, and 4c, the liquid crystal 7, and the facing substrate 1a, after reflecting at the reflection layer 2. This means that the light R passes through the color filters twice in the reflection area 100.

On the other hand, in the transmission area 101, the transmission light T, which is radiated from a backlight, for example, enters from the backside of the panel and passes through the color filters 4a, 4b, and, 4c, the liquid crystal 7, and the facing substrate 1a. Therefore, the transmission light T passes through the color filters 4a, 4b, and, 4c only once. Therefore, the display by the reflection light becomes deeper than the display by the transmission light, because the reflection light passes through the color filters more often than the transmission light passes through the color filters.

The Japanese Patent Laid-Open No. 2001-281648 proposes that the thickness of the color filter in the transmission area should be about twice as thick as the thickness of the color filter in the reflection area. If this rule is followed, the chromatic variance between the reflection display and the transmission display caused by the difference of times the lights pass through the color filters is reduced. Further, the Japanese Patent Laid-Open No. 2001-281648 proposes a method of forming different color filters separately in the reflection area and in the transmission area. Each color filter has different color purity. The Japanese Patent Laid-Open No. 2001-281648 also proposes a structure comprising two layers in only the transmission area where each layer has different color purity.

According to the art disclosed in the Japanese Patent Laid-Open Publication No. 2001-281648, the thickness of the color filter in the reflection area is 0.8 μm, and the thickness of the reflection layer is 0.2 μm. Namely, the thickness of the reflection layer which is formed by conventional manufacturing methods such as sputtering or vacuum evaporation is around 0.2 μm, and the thickness of the color filter required for the color liquid crystal display device is around 0.8 μm.

Therefore, as shown in FIG. 1 of the Japanese Patent Laid-Open Publication No. 2001-281648, if the color filter is formed ranging from the reflection area to the transmission area by a single layer, the thickness of the color filter in the reflection area is 0.8 μm and the thickness of the color filter in the transmission area is 1 μm. This means that the difference between the thickness of the color filter in the reflection area and the thickness of the color filter in the transmission area is only 0.2 μm. Thus, the ratio of the thicknesses of the color filter in the transmission area and that in the reflection area is only 1:0.8=1.25, and it does not satisfy a targeted ratio of approximately 2.

Therefore, in the Japanese Patent Laid-Open Publication No. 2001-281648, in order to make the deepness of the color filter in the transmission area approximately twice as deep as the deepness of the color filter in the reflection area, not only changing the thickness of the color filters, but also forming color filters having different color purities in the reflection area and in the transmission area (in FIG. 3 of Japanese Patent Laid-Open Publication No. 2001-281648), or a two-layered structure comprising two different color filters, each having different color purity (in FIG. 2 of Japanese Patent Laid-Open Publication No. 2001-281648), are proposed.

However, in order to differentiate the color purity of the color filter in the transmission area from the color purity of the color filter in the reflection area, it is necessary to form the color filter in either one area first, the color filter in the other area must be formed later. Also, in order to make the color filter in the transmission area the two-layered structure, it is necessary to form a first color filter only in the transmission area at first, then a second color filter layer should be formed covering both the transmission area and the reflection area. In any case, in the process of forming color filters, at least two steps are required for each color, which means six steps are required in total, resulting in a cost increase due to the increase of the production steps.

SUMMARY OF THE INVENTION

It is an object of the present invention to overcome and resolve the aforementioned problems of the prior art, and provide a half-transmission and half-reflection type color liquid crystal display device that can be manufactured by one process per color The color liquid crystal display device according to one aspect of the present invention comprises a first substrate; a second substrate facing the first substrate; a liquid crystal layer enclosed between the first substrate and the second substrate; a reflection layer laminated on the first substrate, the reflection layer having a reflection area that reflects a light that comes in from the second substrate; and a transmission area that allows a light coming in from the first substrate to pass through to the second substrate; an adjustment film laminated on the reflection area of the reflection layer, the adjustment film having permeability to light; and a color filter laminated on both the adjustment film and the transmission area.

The color liquid crystal display device according to another aspect of the present invention comprises a first substrate; a second substrate facing the first substrate; a liquid crystal layer enclosed between the first substrate and the second substrate; a reflection layer laminated on the first substrate, the reflection layer having a reflection area that reflects a light coming in from the second substrate; and a transmission area that allows a light coming in from the first substrate to pass through to the second substrate; an adjustment film laminated between the reflection area of the reflection layer and the first substrate, the adjustment film having permeability to light; and a color filter laminated on both the reflection layer of the reflection area and the transmission area.

The method of manufacturing a color liquid crystal display device according to still another aspect of the present invention comprises forming a first film on a first substrate in such a manner that the first film reflects a light coming in from a second substrate that faces the first substrate; forming a second film having permeability to light on the first film; selectively removing portions of the first film and the second film to form a transmission area through which the light coming in from the first substrate can pass through to the second substrate and leaving portions of the first film and the second film as a reflection layer and an adjustment film respectively in a reflection area where the light coming in from the second substrate is reflected; forming a color filter on both the adjustment film and the transmission area; panel aligning the first substrate and the second substrate; and enclosing a liquid crystal layer between the first substrate and the second substrate.

The method of manufacturing a color liquid crystal display device according to still another aspect of the present invention comprises selectively forming an adjustment film on the first substrate; forming a reflection layer on the adjustment film, the reflection layer reflecting light coming in from a second substrate that is facing the first substrate; forming a color filter covering the reflection layer and a transmission area in which the light coming in from the first substrate is transmitted to the second substrate; panel align-ing the first substrate and the second substrate; and enclosing a liquid crystal layer between the first substrate and the second substrate.

These and other objects, features and advantages of the present invention are specifically set forth in or will become apparent from the following detailed descriptions of the invention when read in conjunction with the accompanying drawings.

DETAILED DESCRIPTION

Figure 1:
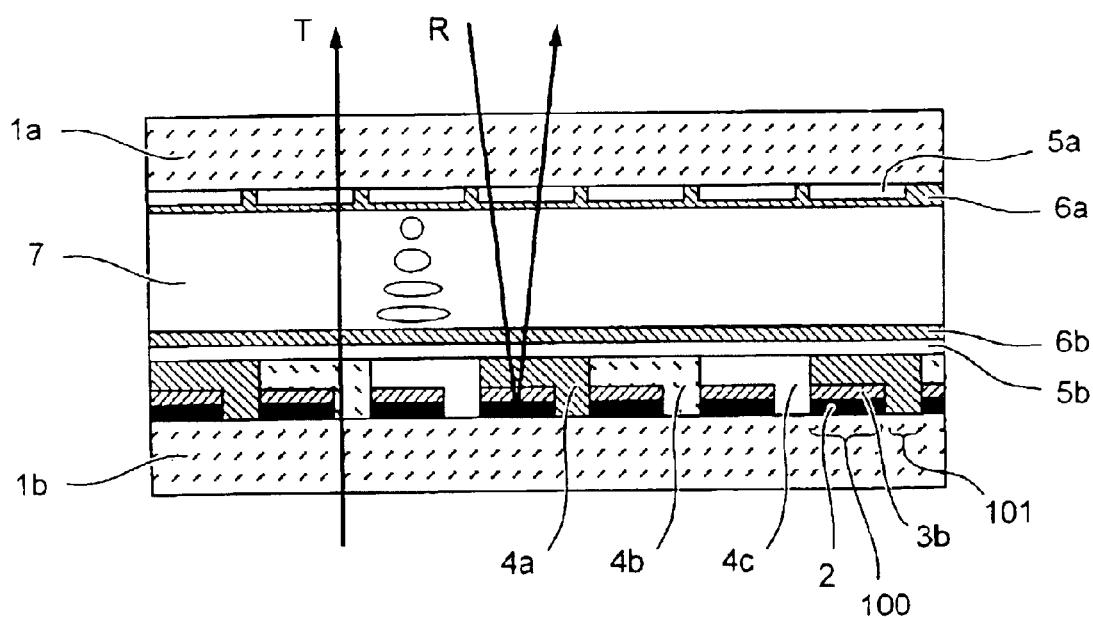
FIG. 1 shows a cross section of the color liquid crystal display device according to a first embodiment of the present invention.

FIG. 1 shows a cross section of a liquid crystal display according to the first embodiment of the present invention. As shown in FIG. 1, the liquid crystal display device according to the first embodiment comprises an adjustment film 3b in the reflection area 100 of each pixel for the purpose of adjusting the thickness of color filters 4a, 4b, and 4c in the reflection area 100. The adjustment film 3b is formed in between the reflection layer 2, which is formed on the glass substrate 1b as a first substrate, and each color filter 4a, 4b, and 4c.

The reflection layer 2 and the adjustment film 3b are not formed in the transmission area 101 of each pixel. That is, each of the color filter 4a, 4b, and 4c is formed on the glass substrate 1b directly. The color filters 4a, 4b, and 4c are common in the reflection area 100 and the transmission area 101. In addition, in the first embodiment, an overcoat layer is not provided, because the adjustment film 3b also serves as a protection layer to protect the surface of the reflection layer 2 during the manufacturing process.

The transparent electrode pattern 5b is formed on the color filters 4a, 4b, and 4c. The alignment layer 6b is formed on the transparent electrode pattern 5b. The first substrate, having the aforementioned structure, and the facing substrate 1a as the second substrate, having the alignment layer 6a and the transparent electrode pattern 5a are panel aligned each other. The liquid crystal 7 is enclosed in between the two substrates.

The thickness of the color filters 4a, 4b and 4c is 0.5 μm to 1 μm in the reflection area 100. The thickness of the color filters 4a, 4b and 4c is 1 μm to 2 μm in the transmission area 101, because the thickness of the color filters 4a, 4b and 4c in the transmission area 101 is preferably twice as thick as the color filters 4a, 4b and 4c in the reflection areas 100. In the light of the fact that the thickness of the reflection layer is 0.08 μm to 0.2 μm, the appropriate thickness of the adjustment film 3b should be 0.3 μm to 1 μm.

For example, if the thickness of the color filters 4a, 4b, and 4c in the reflection area 100 is 0.7 μm and the thickness of the color filters 4a, 4b and 4c in the transmission area 101 is 1.4 μm, the thickness of the adjustment film 3b becomes 0.5 μm to 1 μm in accordance with the thickness of the reflection layer 2. In this case, in the color liquid crystal display device having a structure as shown in FIG. 1, an outside light R enters from the front side of the panel and passes through the facing substrate 1a, liquid crystal 7, an area of 4a, 4b, and 4c where the thickness is 0.7 μm, the adjustment film 3b, and reflects after reaching at the reflection layer 2. The reflected light passes through the adjustment film 3b, in an area of the color filters where the thickness is 0.7 μm, the liquid crystal 7 and the facing substrate 1a.

Therefore, the thickness of the color filters 4a, 4b, and 4c, in the reflection area 100 through which the outside light R passes, becomes 1.4 μm (=0.7 μm×2). On the other hand, a transmission light T enters from the backside of the panel and passes through the glass substrate 1b, in the area of the color filters 4a, 4b and 4c, where the thickness is 1.4 μm, the liquid crystal 7 and the facing substrate 1a. Thus, in the first embodiment, the thickness of the color filters 4a, 4b, and 4c, through which the lights transmit is 1.4 μm, in both the reflection area 100 and the transmission area 101.

Figure 2A:
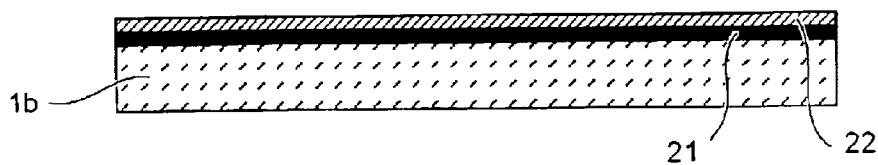
FIGS. 2A to 2E show a manufacturing process of the color liquid crystal display device according to the first embodiment.

A manufacturing process of the color liquid crystal device according to the first embodiment is described below. FIGS. 2A to 2E show the manufacturing process flow of the color liquid crystal device according to the first embodiment of the present invention. First of all, as shown in FIG. 2A, for example, approximately 0.1 μm-thick Al or Ag metal film 21 is deposited on the glass substrate 1b as the first film by means of sputtering or vacuum evaporation. Then, for example, by means of spin coating, a photosensitive epoxy-acrylate resin 22 is coated, for example 0.6 μm-thick, as the second film on the metal film 21.

Figure 2B:
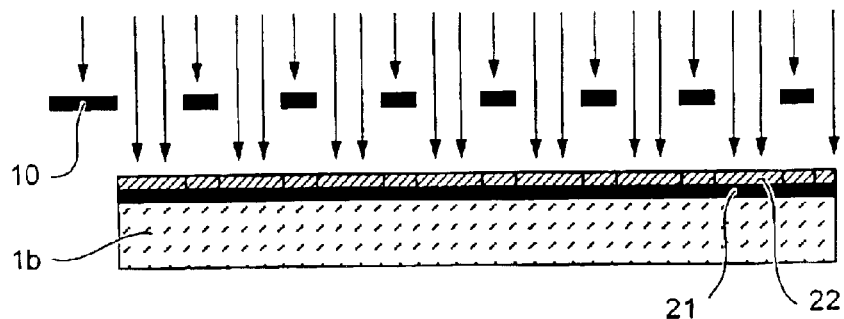

As shown in FIG. 2B, by using a photo mask having desired patterns, the photosensitive epoxy-acrylate resin is exposed. After that, the substrate is baked at 200° C. for 60 minutes to accelerate bridged polymerization of the exposed part of the photosensitive epoxy-acrylate to improve chemical resistance of the resin. The exposed part of the resin turns into the adjustment film 3b.

Figure 2C:
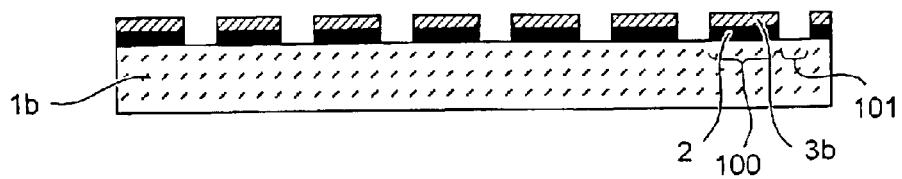

The substrate 1b is immersed in 5% sodium hydrate solution at 50° C. for 3 minutes. By this, as shown in FIG. 2C, the metal film 21 and photosensitive epoxy-acrylate resin 22 are removed selectively in an area that turns into the transmission area 101. Meanwhile the reflection layer 2 and the adjustment film 3b remain in an area that turns into the reflection area 100.

Figure 2D:
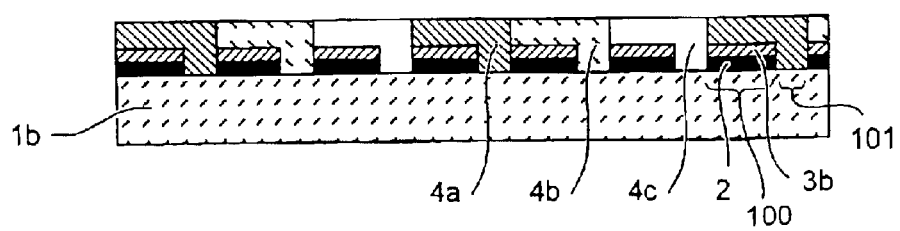

As shown in FIG. 2D, the color filters 4a, 4b, and 4c are formed by coating pigment dispersion type color filter materials, once per each color, by means of, for example, spin coating method. The thickness of each color filter is controlled so as to become, for example, 0.7 μm. By doing so, as the reflection layer 2 is 0.1 μm-thick, and the adjustment film 3b is 0.6 μm-thick, the total thickness of the both films becomes 0.7 μm. Thus, the thickness of the color filters 4a, 4b, and 4c in the transmission area 101 becomes 1.4 μm (=0.1 μm+0.6 μm+0.7 μm).

Figure 2E:
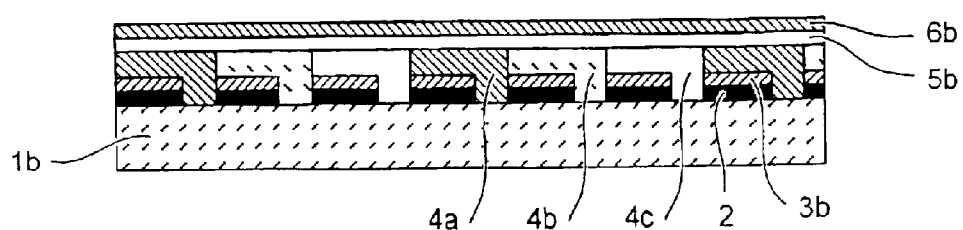

As shown in FIG. 2E, the transparent electrode pattern 5b and the alignment layer 6b are deposited sequentially on the color filters 4a, 4b, and 4c. Then, the substrate shown in FIG. 2E and the facing substrate 1a having the transparent electrode pattern 5a and the alignment layer 6a are panel aligned, then by enclosing the liquid crystal 7 in between the two substrates, the color liquid display device having the structure shown in FIG. 1 can be obtained.

According to the above mentioned first embodiment, as the adjustment film 3b is formed in between the reflection layer 2 in the reflection area 100 and the color filters 4a, 4b, and 4c, coating only once per color makes the thickness of the color filters at the transmission area 101 twice as thick as that in the reflection area 100. Therefore, both the transmission light T passing through the transmission area 101 and the outside light R passing through the reflection area 100, travel the same distance inside the color filters 4a, 4b, and 4c. In addition, the photosensitive epoxy-acrylate resin 22 used as the adjustment film 3b, has a high transmission coefficient in the range of visible light, it is fairly easy to balance the light absorption in the reflection area 100 with the light absorption in the transmission area 101. Therefore, color tone of the color filters 4a, 4b, and 4c recognized from the facing substrate 1a side are recognized equally, regardless of the transmission area 101 and the reflection area 100. Thus, a high quality color display can be obtained.

According to the first embodiment, during the manufacturing process, the photosensitive epoxy-acrylate resin 22 that turns into the adjustment film 3b, also plays the role of the protection layer for the metal film 21 such as Al that turns into the reflection layer 2, because of this, the process of forming an overcoat layer becomes unnecessary. And, as there is no need to remove the photosensitive epoxy-acrylate resin 22 after the patterning is over, the resist removing process can be eliminated, resulting in simplification of the manufacturing process.

According to the first embodiment, in the manufacturing process, as the surface of the metal film 21 is protected by the epoxy-acrylate resin 22, the following restrictions which the conventional technique had can be loosened or eliminated. Among the restrictions of the conventional techniques are, first of all, the surface of the metal film that turns into the reflection layer, can easily be oxidized by acid or alkaline solutions or by hot water, resulting in the deterioration of reflectance. In order to avoid this, it is necessary to use organic solvents in various manufacturing process such as cleaning and resist removal. Secondly, in order to avoid the oxidization of the metal surfaces caused by oxygen existing in air and water, it is necessary to execute storage and transport in a short time until the overcoat layer is formed after the metal layer is deposited. In the first embodiment, any solutions can be used for various treatments, and any process can be applied.

Figure 3:
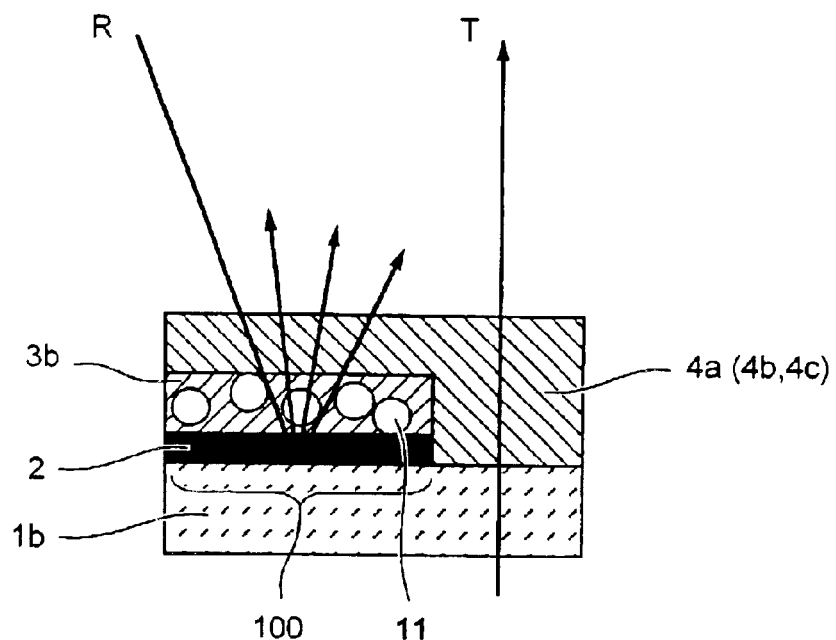
FIG. 3 shows a cross section of an enlarged pixel in one example of the color liquid crystal display device having a light scattering ability according to the first embodiment.
Figure 4:
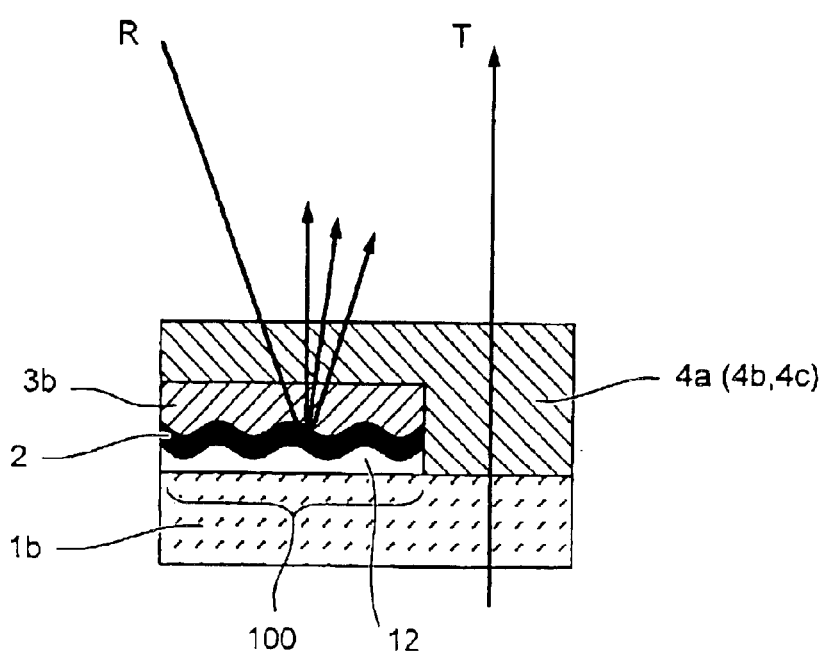
FIG. 4 shows a cross section of an enlarged pixel in another example of the color liquid crystal display device having a light scattering ability according to the first embodiment.

In addition, as shown by a magnified pixel in FIG. 3, it is also possible to mix scattering particle 11, such as silica beads, into the adjustment layer 3b and provide the adjustment film 3 with scattering abilities. In order to realize this structure, the scattering particle 11 may be dispersed in advance in the photosensitive epoxy-acrylate resin 22, which becomes the adjustment film 3b. By doing so, in the reflection area 100, the outside light R scatters in the adjustment layer 3b, and therefore the viewing angle of the color liquid crystal device widens, and a brighter display can be realized. Furthermore, the existence of the scattering layer in the substrate prevents the smear of the display and improves the quality of the display.

As shown by an enlarged pixel in FIG. 1, it is also possible to provide the structure of the reflection layer 2 with abilities of light scattering by making the surface of the reflection layer 2 uneven. In order to realize the structure of this kind, an uneven layer 12 may be formed on the surface of the glass substrate 1b in advance to form the reflection layer 2 thereon. Even in this type of structure, the outside light R scatters at the reflection layer 2 in the reflection area 100, and therefore the viewing angle of the color liquid crystal display device widens, and a brighter display can be realized.

Figure 5:
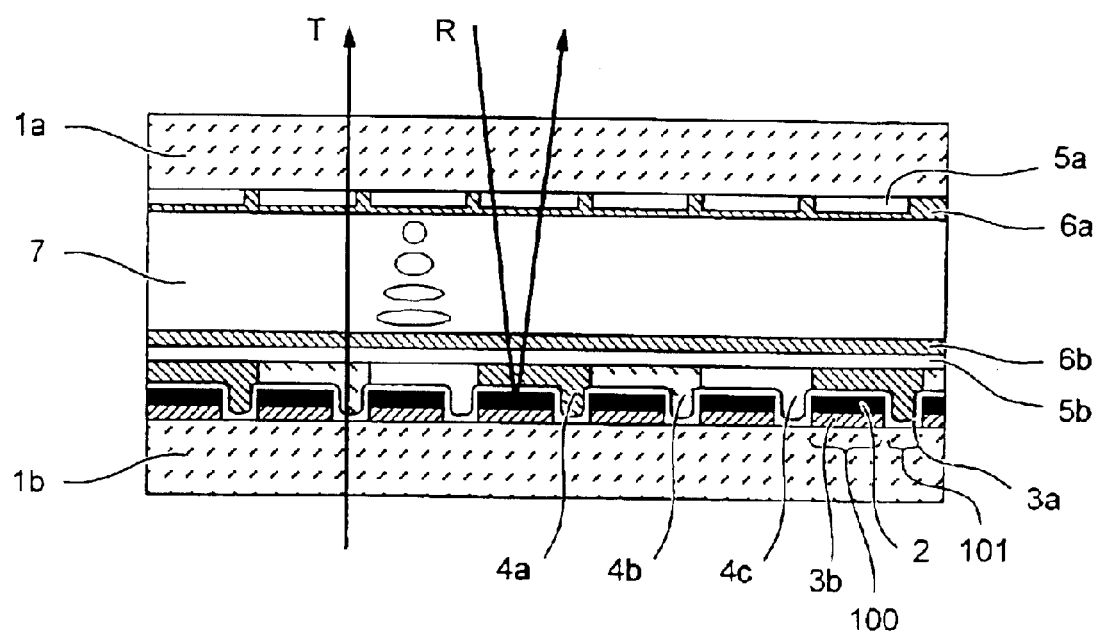
FIG. 5 shows a cross section of a color liquid crystal display device according to a second embodiment of the present invention.

FIG. 5 is a cross-sectional view of a liquid crystal display device according to a second embodiment of this invention. As shown in FIG. 5, the color liquid crystal display device according to the second embodiment possesses the adjustment film 3b in between the glass substrate 1b and the reflection layer 2 in the reflection area 100 of each pixel. Neither the reflection layer 2 nor the adjustment film 3b is provided in the transmission area 101 of each pixel also in the second embodiment.

In the second embodiment, an overcoat layer 3a covers the reflection layer 2 and the surface of the glass substrate 1b in the transmission area 101. This is because the adjustment film 3b is formed underneath the reflection layer 2, and does not play the role of protection of the reflection layer 2, and therefore it is necessary to prevent the surface of the reflection layer 2 from hazing caused by oxidization during manufacture.

The color filters 4a, 4b and 4c are common in the reflection area 100 and the transmission area 101, and are formed on the overcoat layer 3b. And, the transparent electrode pattern 5b and the alignment film 6b are formed in turn on the color filters 4a, 4b, and 4c. The structure which encloses the liquid crystal 7 in between the above mentioned substrate and the facing substrate 1a, having the alignment film 6b and the transparent electrode pattern 5a is the same as that of the first embodiment.

Concerning the thickness of the color filters 4a, 4b, and 4c in the reflection area 100, and the thickness of the color filters 4a, 4b, and 4c in the transmission area 101, the thickness of the reflection layer 2, and the thickness of the adjustment film 3b, the appropriate thickness range of these respective layers are the same as those of the first embodiment. Though the thickness of the overcoat layer 3 is not particularly specified, it is, for example, approximately 0.02 $\mu$m.

Figure 6A:
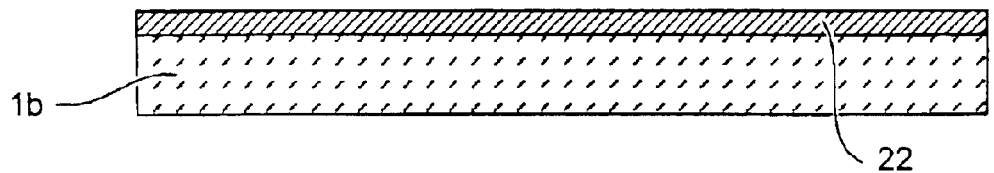
FIGS. 6A to 6D show a first half of a manufacturing process of the color liquid crystal display device according to the second embodiment.

The manufacturing process of the color liquid crystal display device according to the second embodiment is explained below. FIGS. 6A to 6D and FIGS. 7A to 7E show a manufacturing process flow of the color liquid crystal display device according to the second embodiment. At first, as shown in FIG. 6A, by means of spin coating, for example, the photosensitive epoxy-acrylate resin 22 is coated on the glass substrate 1b by the thickness of, for example, 0.6 $\mu$m.

Figure 6B:
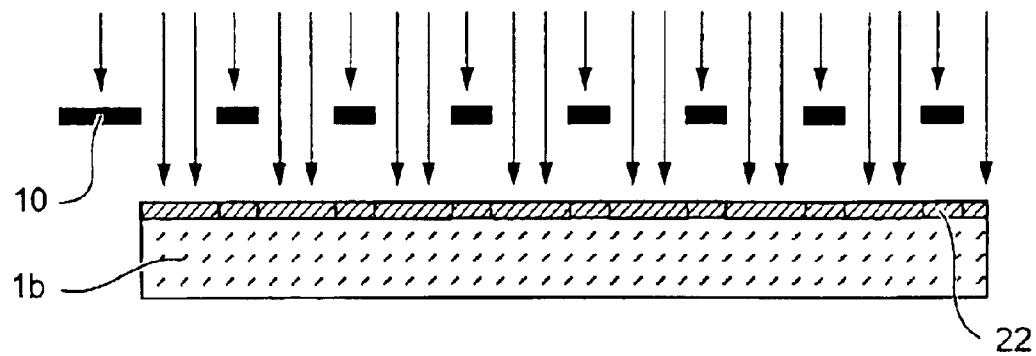
Figure 6C:
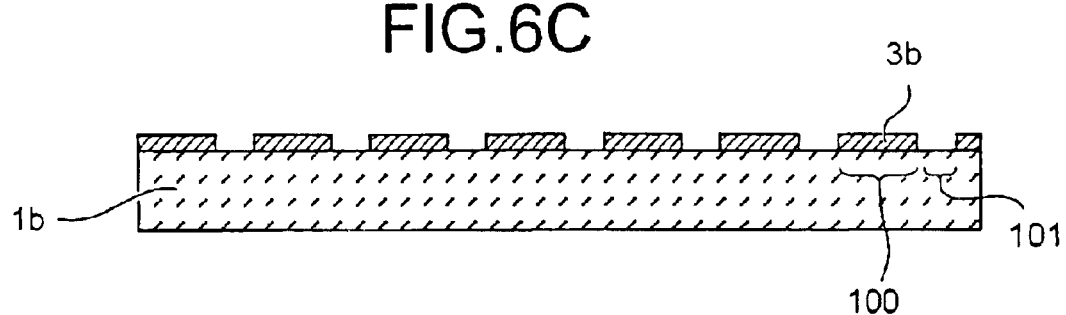

As shown in FIG. 6B, by using the photo mask 10 having desired patterns, the photosensitive epoxy-acrylate resin 22 is exposed and developed. By these treatments, as shown in FIG. 6C, the photosensitive epoxy-acrylate resin 22 is removed selectively in an area that turns into the transmission area 101, but it remains as the adjustment film 3b in an area that turns into the reflection area 100.

Figure 6D:
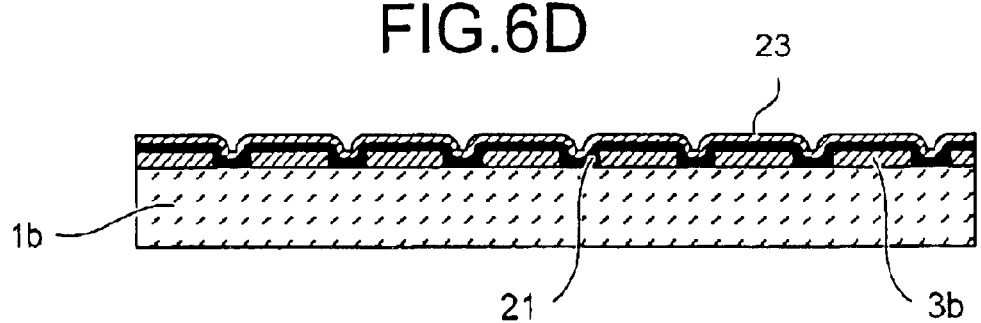

As shown in FIG. 6D, by the method of sputtering or vacuum evaporation, for example, approximately 0.1 $\mu$m thick Al or Ag metal film 21 is deposited on all over the surface of the substrate. Then, the photo resist 23 is coated on the metal film 21. Incidentally, for the photo resist 23, it is possible to use the same photosensitive resin, which is used as the adjustment film 3.

Figure 7A:
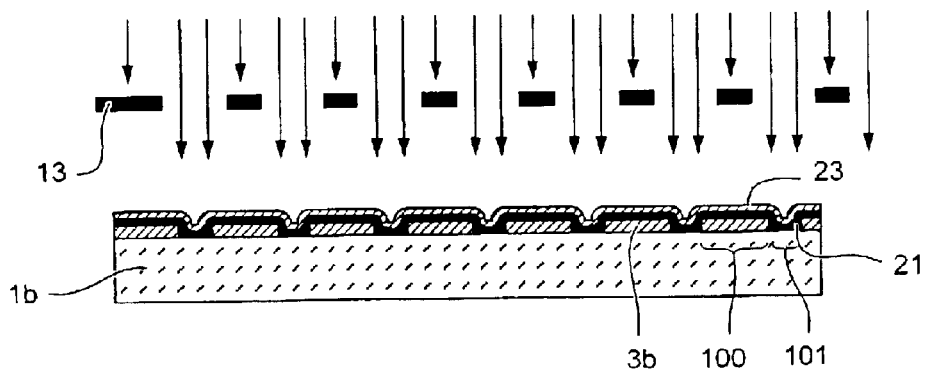
FIGS. 7A to 7E show a latter half of a manufacturing process of the color liquid crystal display device according to the second embodiment.
Figure 7B:
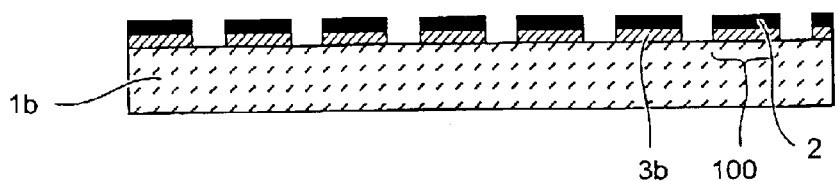

As shown in FIG. 7A, by using a photo mask 13 having the desired patterns, the photo resist 23 is exposed and developed. By these treatments, in an area which becomes the reflection area 100, the metal film 21 remains on the adjustment film 3b, and in the transmission area 101, both the photo resist 23 and the metal layer 21 are removed. Then, by removing the photo resist 23 from the reflection layer 2, as shown in FIG. 7B, the adjustment film 3b and the reflection layer 2 are formed in the area which becomes the reflection area 100.

Figure 7C:
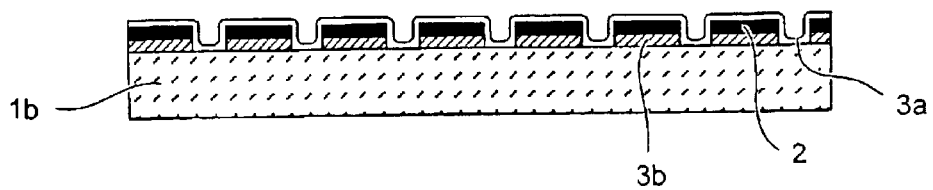
Figure 7D:
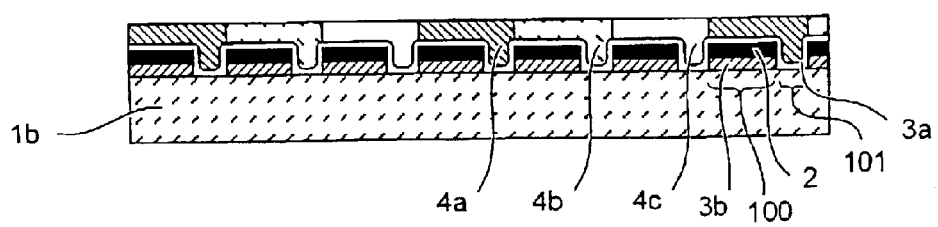

As shown in FIG. 7C, by sputtering, the overcoat layer 3a, for example, 0.22 $\mu$m-thick $SiO_2$, is deposited on all over the substrate surface. After that, as shown in FIG. 7D, by using, for example the spin coating method, each color filter 4a, 4b, and 4c is formed by coating pigment dispersion type color filter materials once per each color, so that the thickness of the color filters 4a, 4b, and 4c becomes, for example, 0.7 $\mu$m in the reflection area 100. The thickness of the color filters 4a, 4b, and 4c in the transmission area 101 becomes approximately 1.4 $\mu$m.

Figure 7E:
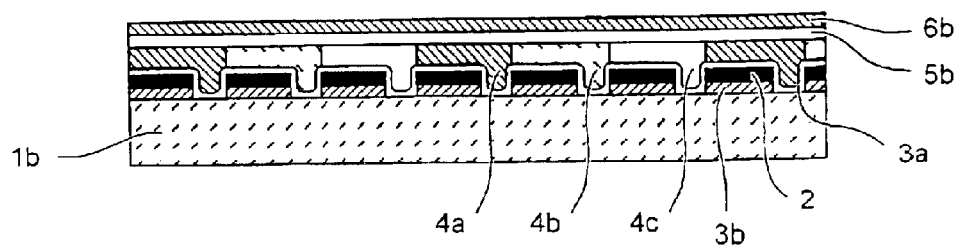

As shown in FIG. 7E, the transparent electrode pattern 5b and the alignment layer 6b are deposited in turn on the color filters 4a, 4b, and 4c, then, the substrate is panel aligned with the facing substrate 1a, having the transparent electrode pattern 5a and the alignment layer 6a. Then, by enclosing the liquid crystal 7 in between the two substrates, the color crystal display device, having the structure as shown in FIG. 5 can be obtained.

According to the second embodiment, the adjustment film 3b is formed in between the glass substrate 1b in the reflection area 100 and the reflection layer 2, and therefore by coating once per each color, the thickness of color filters 4a, 4b and 4c in the transmission area 101 becomes twice as thick as that in the reflection area. As a result, both the transmission light T which passes through the transmission area 101 and the outside light R which passes through the reflection area 100, travel the same distance inside the color filters 4a, 4b, and 4c. Therefore, color tone of the color filters 4a, 4b, and 4c recognized from the facing substrate 1a side are recognized equally regardless of the transmission area 101 and the reflection area 100, thus, a high quality color display can be obtained.

Figure 8:
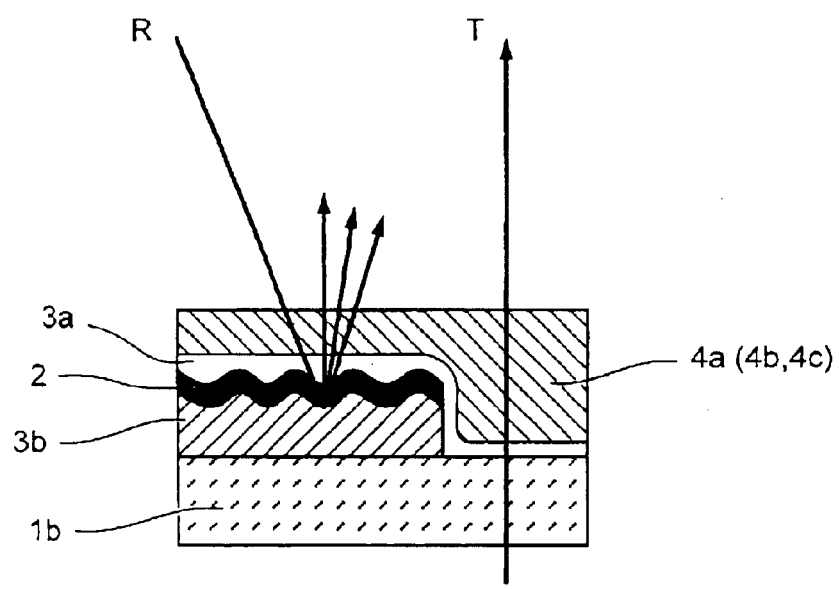
FIG. 8 shows a cross section of an enlarged pixel in one example of the color liquid crystal display device having a light scattering ability according to the second embodiment.
Figure 9:
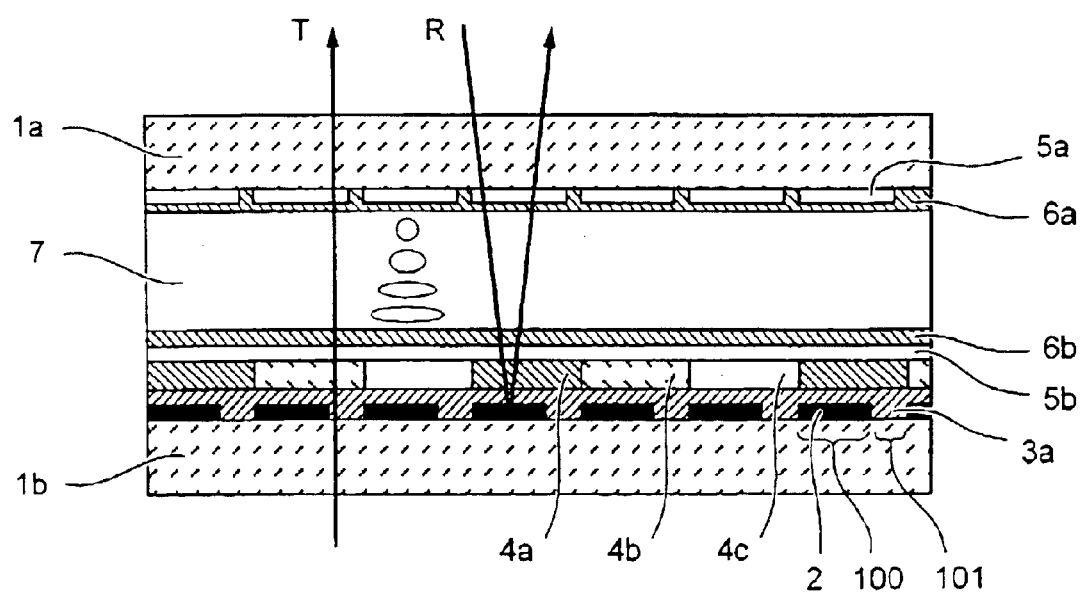
FIG. 9 shows a cross section of a conventional color liquid crystal display device.
Figure 10A:
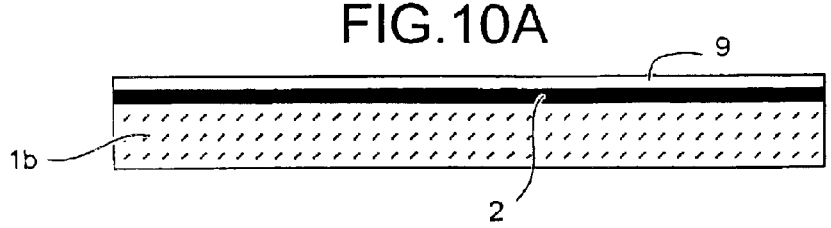
FIGS. 10A to 10F show a manufacturing process of the conventional color liquid crystal display device.
Figure 10B:
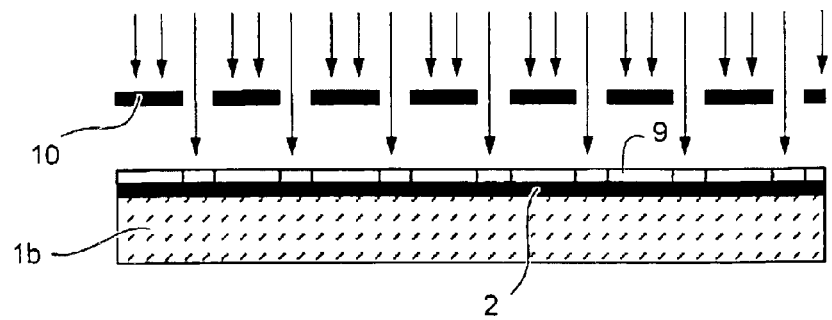
Figure 10C:
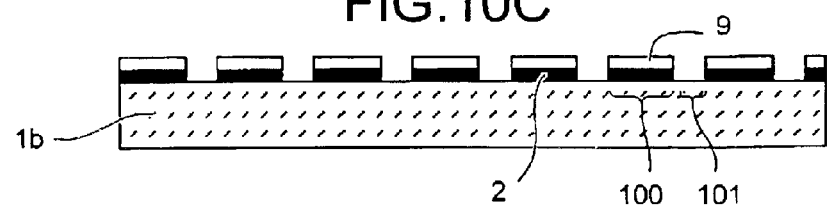
Figure 10D:
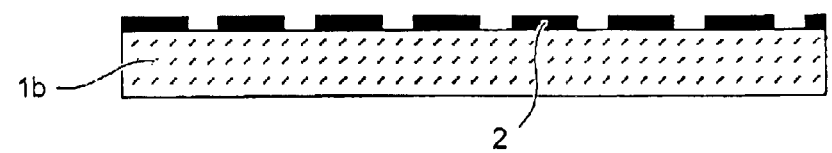
Figure 10E:
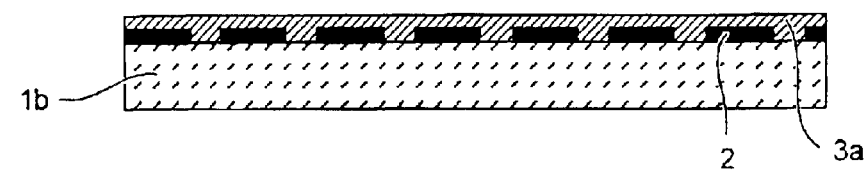
Figure 10F:
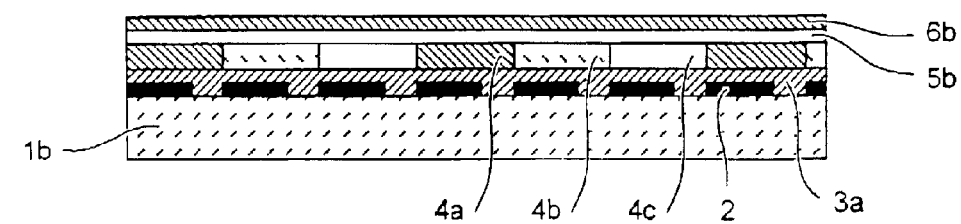

In addition, as shown by an enlarged pixel of FIG. 8, it is possible to form a structure which has a light scattering ability by making the surface of the reflection layer 2 uneven. In order to realize the structure like this, the surface of the adjustment film 3b may be made uneven when it is formed by means of etching or the like. The implementation of these means amounts to the existence of a scattering layer within the substrate. Thus, it is possible to realize a brighter display with a wide viewing angle without smear.

The present invention is possible to modify in various ways and not limited to each aforementioned embodiment. For example, the thickness of the metal film 21 as the reflection layer 2, the thickness of the photosensitive epoxy-acrylate resin 22 as the adjustment film 3b, and the thickness of the color filter material are not limited to the aforementioned thickness. The thickness should be chosen properly in the range of 0.08 μm to 0.2 μm, 0.3 μm to 1 μm, 0.5 μm to 1 μm respectively so that the thickness of the color filters 4a, 4b, and 4c in the transmission area 101 becomes twice as thick as that in the reflection area 100.

The adjustment film 3b is not limited to the photosensitive resin. If the adjustment film 3b is not the photosensitive resin, the material, for the adjustment layer 3b is coated on all over the substrate, and then a photo resist is coated on it. Then, the adjustment film 3b may be formed through patterning by means of photolithography and etching.

As explained above, according to the present invention, it is possible to obtain the color filters whose thickness in the transmission area becomes twice as thick as that in the reflection area by coating only once per each color. Thus, it is advantageously possible to obtain the color liquid crystal display device in which color tones of the color filters are recognized equally regardless of the transmission area and the reflection area.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color liquid crystal display device comprising:
   a first substrate;
   a second substrate facing the first substrate;
   a liquid crystal layer enclosed between the first substrate and the second substrate;
   a reflection layer laminated on the first substrate, the reflection layer having
      a reflection area that reflects a light that comes in from the second substrate; and
      a transmission area that allows a light coming in from the first substrate to pass through to the second substrate;
   an adjustment film laminated on the reflection area of the reflection layer, the adjustment film having permeability to light; and
   a color filter laminated on both the adjustment film and the transmission area.

2. The color liquid crystal display device according to claim 1, wherein a total thickness of the reflection layer and the adjustment film is half of the thickness of the color filter that is laminated on the transmission area.

3. The color liquid crystal display device according to claim 2, wherein the thickness of the reflection layer is greater than 0.08 μm and less than 0.2 μm and the thickness of the adjustment film is greater than 0.3 μm and less than 1 μm.

4. The color liquid crystal display device according to claim 1, wherein the adjustment film scatters a light passing through the adjustment film.

5. The color liquid crystal display device according to claim 4, wherein the adjustment film has scattering particles that scatter the light.

6. The color liquid crystal display device according to claim 1, wherein the reflection layer scatters the light coming in from the second substrate when reflecting the light.

7. The color liquid crystal display device according to claim 6, further comprising an uneven film laminated between the reflection layer and the first substrate, the uneven film having an uneven surface whereby a surface of the reflection layer also becomes uneven.

8. A color liquid crystal display device comprising:
   a first substrate;
   a second substrate facing the first substrate;
   a liquid crystal layer enclosed between the first substrate and the second substrate;
   a reflection layer laminated on the first substrate, the reflection layer having
      a reflection area that reflects a light coming in from the second substrate; and
      a transmission area that allows a light coming in from the first substrate to pass through to the second substrate;
   an adjustment film laminated between the reflection area of the reflection layer and the first substrate, the adjustment film having permeability to light; and
   a color filter laminated on both the reflection layer of the reflection area and the transmission area.

9. The color liquid crystal display device according to claim 8, wherein a total thickness of the reflection layer and the adjustment film is half of the thickness of the color filter that is laminated on the transmission area.

10. The color liquid crystal display device according to claim 9, wherein the thickness of the reflection layer is greater than 0.08 μm and less than 0.2 μm and the thickness of the adjustment film is greater than 0.3 μm and less than 1 μm.

11. The color liquid crystal display device according to claim 8, wherein the reflection layer scatters the light coming in from the second substrate.

12. The color liquid crystal display device according to claim 11, wherein a surface of the reflection layer is made uneven whereby a surface of the adjustment film is uneven.

13. The color liquid crystal display device according to claim 8, further comprising an overcoat layer, which is permeable to light, laminated on the reflection layer.

14. A method of manufacturing a color liquid crystal display device, comprising:
   forming a first film on a first substrate in such a manner that the first film reflects a light coming in from a second substrate that faces the first substrate;
   forming a second film having permeability to light on the first film;
   selectively removing portions of the first film and the second film to form a transmission area through which the light coming in from the first substrate can pass through to the second substrate and leaving portions of the first film and the second film as a reflection layer and an adjustment film respectively in a reflection area where the light coming in from the second substrate is reflected;
   forming a color filter on both the adjustment film and the transmission area;
   panel aligning the first substrate and the second substrate; and
   enclosing a liquid crystal layer between the first substrate and the second substrate.

15. The manufacturing method according to claim 14, wherein the second film is made of a photosensitive resin, and the first film and the second film in the transmission area are selectively removed by exposing and developing the second film.

16. The manufacturing method according to claim 14, further comprising dispersing scattering particles before-hand in the material of the second film before covering the surface of the first film.

17. The manufacturing method according to claim 14, further comprising forming a film with an uneven surface exclusively on the reflection area of the first substrate before forming the first film on the first substrate.

18. The manufacturing method according to claim 14, further comprising sequentially forming a transparent electrode and an alignment layer on the color filter after the formation of the color filters and before panel aligning the first substrate and the second substrate.

19. A method of manufacturing a color liquid crystal display device, comprising:

selectively forming an adjustment film on the first substrate;

forming a reflection layer on the adjustment film, the reflection layer reflecting light coming in from a second substrate that is facing the first substrate;

forming a color filter covering the reflection layer and a transmission area in which the light coming in from the first substrate is transmitted to the second substrate;

panel aligning the first substrate and the second substrate; and enclosing a liquid crystal layer between the first substrate and the second substrate.

20. The manufacturing method according to claim 19, further comprising:

providing an overcoat layer on a surface of the reflection layer after forming the reflection layer and before forming the color filter.

21. The manufacturing method according to claim 19, wherein the adjustment film is made of photosensitive resin and the film of the photosensitive resin existing in the transmission area is selectively removed by exposing and developing the film formed on the first substrate.

22. The manufacturing method according to claim 19, further comprising:

making a surface of the adjustment film uneven before the formation of the reflection layer on the adjustment film.

23. The manufacturing method according to claim 19, wherein when the reflection layer is formed after formation of the adjustment film, a film that turns into the reflection layer is deposited on both the transmission area and the adjustment film and a resist film made of photosensitive resin is coated on the film that turns into the reflection layer, and the photosensitive resin film is removed by exposing in the transmission area.

24. The manufacturing method according to claim 19, further comprising:

sequentially forming a transparent electrode and an alignment layer on the color filter before the panel aligning and after the formation of the color filter.

* * * * *